United States Patent Office 3,360,358
Patented Dec. 26, 1967

3,360,358
NON-SELECTIVE HERBICIDAL METHOD
Alfred P. Kozacik, Gloucester, and Herbert Myers, Camden, N.J., assignors to Mobil Oil Corporation, a corporation of New York
No Drawing. Filed Oct. 18, 1965, Ser. No. 497,549
3 Claims. (Cl. 71—102)

This invention relates to the control of plant growth. It is more particularly concerned with a method for killing undesired plants.

As is well known to those familiar with the art post-emergence herbicides can be selective or non-selective. Selective herbicides are used, for example, when it is desired to kill weeds and other undesired vegetation without damaging a crop plant. In many cases, however, it is desired to kill all plant life and a non-selective post-emergence herbicide can be used. Typical places where non-selective herbicides are used include roadways, parking lots, railroad tracks, tennis courts, and around industrial buildings and installations.

It is the discovery of this invention that plant life can be killed, non-selectively, by contacting the plant with a herbicidal amount of an alkylxanthogen monosulfide or a derivative thereof.

Accordingly, it is a broad object of this invention to provide non-selective post-emergence herbicides, another object is to provide a method for non-selectively killing plants. A specific object is to provide a method for killing plants by contacting them with certain alkylxanthogen monosulfides. Other objects and advantages of this invention will become apparent to those skilled in the art, from the following detailed description.

The present invention provides a method for killing plants that comprises contacting them with an herbicidal amount of a monosulfide having the formula:

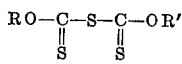

wherein R and R' are alkyl groups containing between 1 and about 18 carbon atoms; and substituted derivatives thereof.

In the formula set forth hereinabove, R and R' are alkyl groups having between one and about 18 carbon atoms. Both alkyl groups can be the same or they can be different. It is within the contemplation of this invention that the alkyl groups can be substituted with halogen, nitro, amino, hydroxyl, cyano, or carboxylic groups. Non-limiting examples of the xanthogen monosulfides are bis(methyl xanthogen)monosulfide,
bis(ethyl xanthogen)monosulfide,
bis(2-chloropropyl xanthogen)monosulfide,
bis(4-bromoamyl xanthogen)monosulfide,
bis(2-carboxyethyl xanthogen)monosulfide,
bis(5-nitrohexyl xanthogen)monosulfide,
bis(5-aminohexyl xanthogen)monosulfide,
bis(2-cyanoisopropyl xanthogen)monosulfide,
bis(2-ethylhexyl xanthogen)monosulfide,
bis(10-hydroxydecyl xanthogen)monosulfide,
bis(tetradecyl xanthogen)monosulfide,
bis(hexadecyl xanthogen)monosulfide,
bis(stearyl xanthogen)monosulfide,
(methyl xanthogen)(ethyl xanthogen)monosulfide,
(ethyl xanthogen)(hexadecyl xanthogen)monosulfide,
(5-aminohexyl xanthogen)(2-ethylhexyl xanthogen) monosulfide and
(chloropropyl xanthogen)(ethyl xanthogen)monosulfide.

In carrying out the method of this invention for killing plants, the herbicides can be applied in various ways. They may be applied per se, in vaporized form, but are preferably applied as the toxic components in herbicidal compositions. The compositions can be applied as ducts, as liquid sprays, or as gas-propelled sprays and may contain in addition to a carrier, additives such as emulsifying agents, wetting agents, binding agents, gases compressed to the liquid state, odorants, stabilizers and the like. The exact quantity of the compounds of this invention to be utilized in herbicidal compositions, as is well known to those skilled in the art, will be found to vary rather widely and depends to some extent upon the type of composition in which the material is being employed, method of application, nature of the condition to be controlled, and other commonly encountered factors. Liquid carriers which may be employed include water, organic solvents, and mineral oils as well as other solvents or suspending agents.

In practice, herbicidal application is measured in terms of pounds of herbicide applied per acre. The alkyl xanthogen monosulfides are effective non-selective herbicides, when applied in herbicidal amounts, i.e., at rates between about 2 pounds and about 10 pounds per acre.

The following examples illustrate the preparation of typical alkyl xanthogen monosulfides contemplated herein and their effectiveness as non-selective herbicides.

EXAMPLE 1

*Preparation of bis(iso-propyl xanthogen)monosulfide*

Sodium iso-propyl xanthate (200 g.) and 600 ml. absolute ethanol were placed in a flask equipped with a stirrer, thermometer, nitrogen inlet tube and a reflux condenser. A solution of cyanogen bromide (67 g.) in 200 ml. absolute ethanol was then added over ½ hour while maintaining the reaction temperature at 0–10° C. After completion of the addition, the reaction mixture was stirred for an additional 4 hours at 5° C. and added to an excess of distilled water. A red oil separated which was extracted with benzene, water washed to neutral point, and dried over sodium sulfate. Removal of the benzene under vacuum at low temperatures yielded 70 g. of a red oil which crystallized on standing. Recrystallization from ethanol gave 53 g. of a yellow solid, M.P. 50° C. (uncorr.).

*Analysis.*—Calc'd: sulphur, 40.4%; Bromine, nil percent. Found: sulphur, 42.4%; bromine, nil percent.

EXAMPLE 2

*Preparation of bis(n-propyl xanthogen)monosulfide*

In a manner similar to Example 1, sodium n-propyl xanthate (200 g.) and cyanogen bromide (66 g.) were reacted in absolute ethanol to yield 65 g. of a dark brown liquid. Fractional distillation of the liquid gave 45 g. of a clear yellow liquid. $b0.05 = 122$–133° C.

*Analysis.*—Calc'd: Sulphur, 40.4%; bromine, nil, Found: Sulfur, 42.0%; bromine, nil.

*Herbicidal effectiveness*

Disposable composition flats 2½ inches by 12 inches are seeded with selected crop and weed seed, using individual containers for each type seed. When the seedlings of the respective crops and weeds are about 3–6 inches high, they are sprayed with a water dispersion of the herbicide being tested. Application is made by passing the flats on an automatic conveyor belt traveling at 1½ miles per hour through a delivery system calibrated to deliver 1–10 pounds herbicide per acre.

Fourteen days after herbicidal application, the treated weed and crop plants are observed for injury and the extent of control (percent phytotoxicity). Injury is rated as dead (all plants killed), severe (plants usually did not recover), moderate (recovery, but with reduced top growth), or slight.

EXAMPLES 3 AND 4

Each of the compounds of Examples 1 and 2, respectively, was dissolved in acetone and dispersed in water. In the aforedescribed method for testing herbicidal effectiveness, each compound was applied to test plants at a dosage of 10 pounds per acre. Pertinent results on weed and crop plants are set forth in the table.

TABLE

| Test Plants | Example 3 (Cpd. of Example 1) | | Example 4 (Cpd. of Example 2) | |
|---|---|---|---|---|
| | Injury | Percent Control | Injury | Percent Control |
| Sugar beets | Severe | 90 | Dead | 100 |
| Clover | Dead | 100 | do | 100 |
| Wheat | Severe | 80 | Severe | 70 |
| Oats | do | 80 | do | 80 |
| Corn | do | 80 | Dead | 100 |
| Soybeans | Dead | 100 | do | 100 |
| Mustard | do | 100 | do | 100 |
| Barnyard grass | Severe | 90 | Severe | 90 |
| Yellow foxtail | do | 80 | do | 80 |
| Crabgrass | Dead | 100 | Dead | 100 |
| Buckwheat | do | 100 | do | 100 |
| Morning glory | do | 100 | do | 100 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for killing plants that comprises contacting them with an herbicidal amount of a monosulfide having the formula:

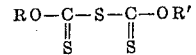

wherein R and R' are alkyl groups containing between 1 and about 18 carbon atoms; and substituted derivatives thereof.

2. A method for killing plants that comprises contacting them with between about 2 pounds per acre and about 10 pounds per acre of bis(isopropyl xanthogen)monosulfide.

3. A method for killing plants that comprises contacting them with between about 2 pounds per acre and about 10 pounds per acre of bis(n-propyl xanthogen)monosulfide.

References Cited

UNITED STATES PATENTS

| 2,615,802 | 10/1952 | Bruner | 71—102 |
| 2,615,804 | 10/1952 | Stewart et al. | 71—102 |
| 2,600,861 | 6/1952 | England | 71—72 |

JAMES O. THOMAS, JR., *Primary Examiner.*

J. THOMAS, *Assistant Examiner.*